United States Patent
Shang et al.

(10) Patent No.: US 7,540,704 B2
(45) Date of Patent: Jun. 2, 2009

(54) METHOD AND SYSTEM FOR DETERMINING GAS TURBINE TIP CLEARANCE

(75) Inventors: Tonghuo Shang, East Lyme, CT (US); Anthony D. Kurtz, Saddle River, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 239 days.

(21) Appl. No.: 11/063,205

(22) Filed: Feb. 22, 2005

(65) Prior Publication Data

US 2005/0286995 A1 Dec. 29, 2005

Related U.S. Application Data

(60) Provisional application No. 60/582,289, filed on Jun. 23, 2004.

(51) Int. Cl.
*F01D 25/00* (2006.01)
(52) U.S. Cl. ............................. 415/1; 415/118
(58) Field of Classification Search ............ 416/1, 416/61; 415/173.1, 173.2, 173.4, 118, 116, 415/1
See application file for complete search history.

(56) References Cited

U.S. PATENT DOCUMENTS

| | | | |
|---|---|---|---|
| 3,244,006 A * | 4/1966 | Delmonte | 73/727 |
| 3,754,433 A * | 8/1973 | Hyer | 415/14 |
| 4,180,329 A | 12/1979 | Hildebrand | |
| 4,357,104 A | 11/1982 | Davinson | |
| 4,384,819 A | 5/1983 | Baker | |
| 4,632,635 A | 12/1986 | Thoman et al. | |
| 4,971,517 A | 11/1990 | Perkey et al. | |
| 5,612,497 A * | 3/1997 | Walter et al. | 73/756 |
| 6,717,418 B2 | 4/2004 | Orenstein | |

OTHER PUBLICATIONS

Kulite Water/Air Cooled IS Transducer. WCT-250, [online], [retrieved on Feb. 28, 2007] Retrived from Kulite website unsing Internet <URL:http://www.kulite.com/pdfs/pdf_Data_Sheets/WCT-250.pdf>.*
Kulite Water/Air Cooled IS Transducer. WCT-312, [online], [retrieved on Feb. 28, 2007] Retrived from Kulite website unsing Internet <URL:http://www.kulite.com/pdfs/pdf_Data_Sheets/WCT-312.pdf>.*
Ivey, Paul C. and Ferguson, Derek G. ASME Paper No. GT-2002-30046. pp. 235-242. An Air-Cooled Jacket Designed to Protect Unsteady Pressure Transducers at Elevated Temperatures in Gas Turbine Engines. Proceesings of ASME Turbo Expo 2002. Jun. 3-6, 2002. Amsterdam, The Netherlands.*

* cited by examiner

*Primary Examiner*—Richard Edgar
(74) *Attorney, Agent, or Firm*—The Plevy Law Firm

(57) ABSTRACT

A system for sensing at least one physical characteristic associated with an engine including a turbine having a plurality of blades turning inside a casing, the system including: a pressure sensor coupled substantially adjacent to the casing and including at least one output; a port in the turbine casing for communicating a pressure indicative of a clearance between the blades and casing to the pressure sensor; a cooling cavity substantially surrounding the pressure sensor; and, an inlet for receiving fluid from the engine and feeding the fluid to the cooling cavity to cool the pressure sensor; wherein, the pressure sensor output is indicative of the clearance between the blades and casing.

26 Claims, 1 Drawing Sheet

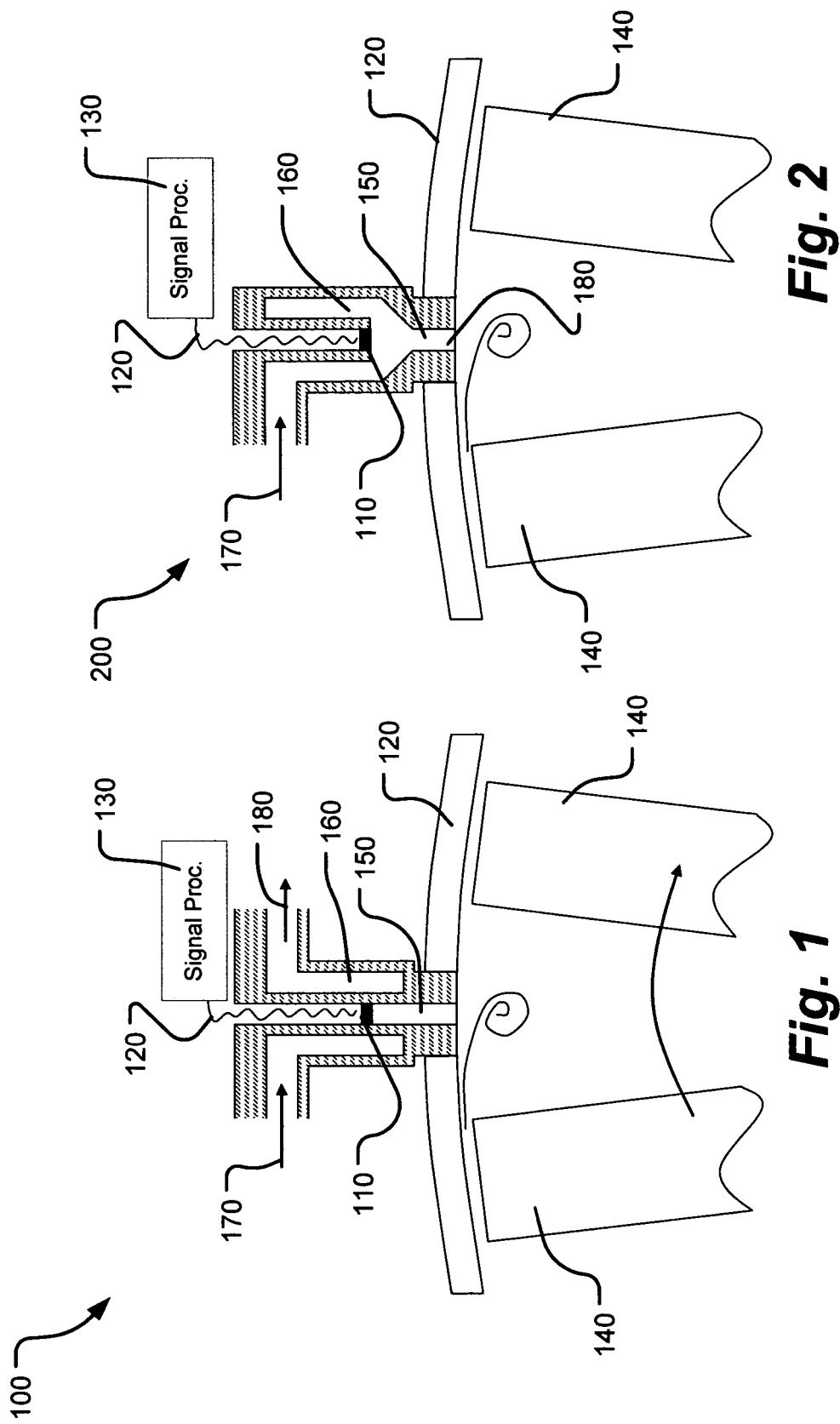

METHOD AND SYSTEM FOR DETERMINING GAS TURBINE TIP CLEARANCE

RELATED APPLICATION

This application claims the benefit of priority of U.S. Provisional Patent Application Ser. No. 60/582,289, filed Jun. 23, 2004, entitled "Gas Turbine Tip Clearance Measurement Using Case-Mounted Pressure Transducers", the entire disclosure of which is hereby incorporated by reference in its entirety.

FIELD OF THE INVENTION

The invention relates generally to gas turbine engines and their operation, and more particularly to gas turbine engine tip clearance measurement systems.

BACKGROUND OF THE INVENTION

It is well known that tip clearance leakage is one of the primary loss mechanisms in axial flow compressors and turbines of a gas turbine engine. Tip clearance loss translates into lost efficiency, higher fuel costs and thus higher operating costs. More particularly, over the operating life of an engine such as an aircraft engine, tip clearance increases over time, due at least in part to mechanical rubs between rotating blades and stationary casing and erosion. This clearance deterioration is a leading driver for engine performance deterioration, which often manifests in increased fuel burn and exhaust gas temperatures (EGT). The FAA mandates that an engine be removed for maintenance/overhaul once the EGT reaches an upper limit.

It is desirable therefore to maintain tip clearance as low as possible in an effort to minimize related losses throughout the engine-operating envelope. One way of achieving this is to use Active tip Clearance Control (ACC) systems, such that clearance levels are adjusted for engine operating conditions, and throughout the operating cycle. For any ACC concept to work effectively, real-time tip clearance data is required as part of the control algorithm. However, current tip clearance sensors are believed to be deficient in certain regards.

Accordingly, an alternative tip clearance measurement technique and system for accomplishing tip clearance measurement is highly desirable.

SUMMARY OF THE INVENTION

A system for sensing at least one physical characteristic associated with an engine including a turbine having a plurality of blades turning inside a casing, the system including: a pressure sensor coupled substantially adjacent to the casing and including at least one output; a port in the turbine casing for communicating a pressure indicative of a clearance between the blades and casing to the pressure sensor; a cooling cavity substantially surrounding the pressure sensor; and, an inlet for receiving a fluid such as compressed air from the engine and feeding the compressed air to the cooling cavity to cool the pressure sensor; wherein, the pressure sensor output is indicative of the clearance between the blades and casing.

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to like parts, and:

FIG. 1 illustrates gas turbine tip clearance sensor system according to an aspect of the present invention; and, FIG. 2 illustrates gas turbine tip clearance sensor system according to an aspect of the present invention.

DETAILED DESCRIPTION OF THE PREFERRED EMBODIMENTS

It is to be understood that the figures and descriptions of the present invention have been simplified to illustrate elements that are relevant for a clear understanding, while eliminating, for the purpose of clarity, many other elements found in typical gas turbine engines and methods of making and using the same, and pressure sensing systems and methods of making and using the same. Those of ordinary skill in the art may recognize that other elements and/or steps may be desirable in implementing the present invention. However, because such elements and steps are well known in the art, and because they do not facilitate a better understanding of the present invention, a discussion of such elements and steps is not provided herein.

FIG. 1 illustrates a schematic cross section of an exemplary turbine system 100 including a pressure transducer 110 mounted substantially adjacent to, including for example, within the interior of, turbine case 120. Transducer 110 measures pressure on the turbine case 120, and provides a signal indicative of the sensed pressure via leads (not shown) electrically coupled thereto.

Turbine system 100 may include an engine assembly that takes the form of a conventional gas turbine engine. In operation, blades 140 of engine 100 rotate past port 150 which communicates the pressure at the turbine casing 120 to transducer 110. As a result of blade rotation, the pressure sensed by transducer 110 varies. As a blade passes and obscures port 150, the inlet of port 150 is essentially closed and the pressure communicated to transducer 110 is essentially the ambient static pressure. The inlet to port 150 becomes un-obscured after the blade passes. At this point, the communicated and sensed pressure rises to a maximum pressure indicative of blade 140 loading. This cyclic process repeats as each of the turbine blades 140 passes port 150.

As is understood, tip clearance size affects the blade loading. This is due to leakage flows from one side of the blade to the other across the clearance gap. Hence, the unsteady pressure field exerted upon port 150 is a function of tip clearance size. The functional dependence between the two tip clearance and the pressure signature as measured by the transducer may be established through computer modeling and/or calibration testing, for example. Thus, one may derive real-time tip clearance data from sensing the unsteady pressure signature resulting from turbine blades passing by a case mounted pressure transducer.

As will be understood by those possessing an ordinary skill in the pertinent arts, pressure transducer 110 may have a frequency response capability roughly 5-10 times that of the blade passing frequency in order to resolve the flow structure at the blade tip region. For example, the blade passing frequency for a high-pressure turbine in a typical modern gas turbine engine may be around ten kilohertz (10 KHz). Accordingly, transducer 110 may have a frequency response on the order of about 50 KHz-100 KHz. Such high frequency operation may require transducer 110 to be mounted close to turbine casing 120—as a physically extending port 150 may serve to essentially low-pass filter the pressure signature resulting from turbine blades 140 passing port 150.

The output of pressure transducer 110 may optionally be provided to a signal processing and conditioning electronics module 130 remotely located within the system 100. Sensor 110 and /or signal processor 130 may provide one or more signals indicative of an operating condition of the engine assembly 100, such as turbine tip clearance.

Signal processing and conditioning electronics module 130 may include a processor and memory, by way of example only. "Processor", as used herein, refers generally to a computing device including a Central Processing Unit (CPU), such as a microprocessor. A CPU generally includes an arithmetic logic unit (ALU), which performs arithmetic and logical operations, and a control unit, which extracts instructions (e.g., code) from memory and decodes and executes them, calling on the ALU when necessary "Memory", as used herein, refers to one or more devices capable of storing data, such as in the form of chips, tapes or disks. Memory may take the form of one or more random-access memory (RAM), read-only memory (ROM), programmable read-only memory (PROM), erasable programmable read-only memory (EPROM), or electrically erasable programmable read-only memory (EEPROM) chips, by way of further non-limiting example only. The memory utilized by the processor may be internal or external to an integrated unit including the processor. For example, in the case of a microprocessor, the memory may be internal or external to the microprocessor itself. Of course, module 130 may take other forms as well, such as an electronic interface or Application Specific Integrated Circuit (ASIC).

As is well understood by those possessing an ordinary skill in the pertinent arts, in general an axial flow turbine engine includes a compressor, combustion area and turbine. In compressor applications, the casing temperature is at or below 1300 degrees Fahrenheit (1300° F.). In the turbine section, the metal temperature can reach as high as 2500° F. According to an aspect of the present invention, transducer cooling may used. According to another aspect of the present invention, pressure transducers for turbine clearance measurement may be air cooled, optionally using the same cooling air that may be used to cool the turbine casing.

Referring still to FIG. 1, there is shown a cooling chamber 160 substantially surrounding transducer 110 and having a cooling air inlet 170 and outlet 180. Cooling air for inlet 170 may be drawn from a compressor of turbine system 100, and thus have a temperature around 1300° F., for example. The cooling air may circulate through chamber 160, cooling transducer 110 and/or the immediate environment it is subjected to, and then exit outlet 180. A high temperature pressure transducer, such as model WCT-250 or WCT-312 cooled by air of water pressure sensor, commercially available from Kulite Semiconductor Products, Inc. the assignee hereof, may be used in combination with such a cooling scheme to provide a system that can reliably operate in a high temperature, high pressure turbine environment.

Referring now to FIG. 2, there is shown a turbine system 200 according to an aspect of the present invention. Like references have been used in FIGS. 1 and 2 to designate like elements of the invention. Hence, a detailed discussion of those common elements will not be repeated. In system 200, cooling air is again fed into a chamber 160 substantially surrounding pressure transducer 110 via inlet 170. The cooling air is again discharged using an outlet 180. However, outlet 180 of system 200 discharges spent cooling air into the main gas path, i.e., into the turbine. Outlet 180 may discharge into port 150, such that pressure sensing port 150 of system 200 will have a net air outflow, forming a discharge jet into the turbine. This allows an interaction between the discharge jet and the passing turbine blades 140. This interaction may enhance the sensing of the unsteady pressure as a function of tip clearance size. Parameters, such as discharge jet velocity and flow rate of the cooling chamber, inlet and outlet may be chosen to maximize the sensitivity of the sensed unsteady pressure signal as a function of tip clearance.

By way of further, non-limiting example only, the cooling airflow in FIG. 2 is modulated by the relative motion of turbine blades or airfoils. The cooling air is first modulated by the interaction between the cooling air and unsteady pressure field around each turbine blade. The unsteady pressure fluctuations will modulate cooling airflow rate, therefore affecting air pressure measured by the pressure sensor. The cooling air is also modulated by the interaction with the turbine blades themselves. When the turbine blades periodically pass over the cooling air discharge jet, a blockage effect occurs when the turbine blade is aligned with the discharge jet, whereas no or little blockage is present without such an alignment. This on and off blockage effect modulates the cooling airflow rate, again impacting unsteady pressure measurements. The amount of blockage, and the resultant pressure fluctuations, will depend on blade geometry and tip clearance size. As blade geometry is known, tip clearance may be deduced.

According to an aspect of the present invention, by sizing the cooling air discharge and cooling chamber geometries, one may "acoustically tune" the effect on transducer 110 so as to maximize pressure fluctuations due to tip clearance changes, thus increasing tip clearance measurement accuracy.

According to an aspect of the present invention, transducer 110 may also be utilized to measure turbine rotational speed. Transducer 110 senses the turbine blade passing frequency, by sensing the unsteady pressure field generated each time a turbine blade 140 passes port 150. Using this frequency, together with the known configuration of the turbine itself, such as the number of blades installed on the turbine wheel, one may readily deduce turbine shaft speed. Such a shaft speed sensor may prove more reliable, and physically lighter than conventional magnetic speed transducers. Further, as a same transducer may be used to provide multiple functionality according to an aspect of the present invention, additional cost savings to the engine system as a whole may be realized.

According to an aspect of the present invention, tip clearance may be adjusted using a conventional methodology responsively to the output of the pressure transducer.

Those of ordinary skill in the art may recognize that many modifications and variations of the present invention may be implemented without departing from the spirit or scope of the invention.

What is claimed is:

1. A system for sensing at least one physical characteristic associated with an engine comprising a turbine having a plurality of blades turning inside a casing, said system comprising:
   a casing coupled with the turbine, said casing having a longitudinal port, said port extending transverse to said casing with a first end of said port opening inside said casing; and
   a pressure transducer mounted substantially adjacent to said casing, in said port, said pressure transducer facing said first end, said port communicating to said pressure transducer a first pressure in the presence of said turbine blades and a second pressure when said turbine blade is not present;
   wherein, said pressure transducer has a frequency response capability which is a multiple of the blade passing frequency, and a processor receiving said first and second pressure outputs to determine a clearance between said blades and casing.

2. The system of claim 1, further comprising:
a cooling cavity substantially surrounding said pressure transducer; and
an inlet for receiving a fluid from said engine and feeding said fluid to said cooling cavity to cool said pressure transducer.

3. The system of claim 2, wherein said engine further comprises a compressor, and said inlet is substantially adjacent to said compressor.

4. The system of claim 3, wherein said fluid is compressed air.

5. The system of claim 4, further comprising an outlet for receiving said compressed air from said cavity and expelling said compressed air.

6. The system of claim 5, wherein said outlet is external to said casing.

7. The system of claim 2, wherein said cavity is further coupled to said port.

8. The system of claim 7, wherein said inlet and port are configured such that said port has a net fluid flow into said casing.

9. The system of claim 1, wherein said signal processor comprises code for determining a turbine rotational speed responsively to said pressure transducer output.

10. The system of claim 1, wherein said signal processor comprises a memory storing data indicative to said engine.

11. The system of claim 1, wherein said pressure transducer has a frequency response of about 5 to 10 times that of the blade passing frequency.

12. A method for determining turbine blade clearance in a turbomachine comprising a plurality of radially extending blades within a stationary turbine casing, said method comprising;
mounting at least one pressure sensing transducer on at least one interior wall within a port of said turbine casing, said pressure transducer mounted substantially adjacent to said casing;
sensing, by said at least one pressure sensing transducer, a first pressure signal caused by an unsteady pressure field on the casing as a function of tip clearance size as a corresponding blade passes said transducer and a second pressure signal caused by a steady pressure field on the casing; and
determining a clearance between said casing and said plurality of blades dependent upon said first and second pressure signals, wherein said pressure transducer has a frequency response capability which is a multiple of the blade passing frequency.

13. The method of claim 12, wherein said pressure transducer has a frequency response of about 5 to 10 times that of the blade passing frequency.

14. The method of claim 12, further comprising the step of providing a first air chamber substantially adjacent en exterior wall of said port, said air chamber having an inlet port for receiving cooling air for circulation within said chamber, and an outlet port for allowing said circulated air to exit said chamber.

15. The method of claim 14, wherein said cooling air is around 1300° F.

16. The method of claim 14, wherein said outlet is external to said casing.

17. The method of claim 14, wherein said inlet and said port are configured such that said port has a net air flow into said casing.

18. The method of claim 12, further comprising adjusting the blade tip clearance in response to said generated signal.

19. The method of claim 12, wherein said turbomachine further comprises a compressor, and said inlet is substantially adjacent to said compressor.

20. The method of claim 12, further comprising coupling a signal processor to said pressure sensing transducer.

21. The method of claim 20, wherein said signal processor comprises code for determining a turbine rotational speed responsively to said output.

22. The method of claim 21, wherein said signal processor comprises a memory storing data indicative of said turbomachine.

23. An engine system comprising:
a compressor, a combustion area and turbine, said turbine having a plurality of blades turning inside a casing;
a port in said turbine casing; and
a pressure sensor coupled substantially adjacent to said casing and including at least one output; said pressure sensor mounted in said port wherein a first pressure indicative of a clearance between said turbine blades and said casing and a second pressure indicative of an ambient pressure is communicated to said pressure sensor through said port;
wherein said pressure sensor has a frequency response capability which is a multiple of the blade passing frequency; and
a processor for receiving said first and second pressures and determining a clearance between said blades and cases based on said received pressures.

24. The engine of claim 23, wherein said pressure transducer has a frequency response of about 5 to 10 times that of the blade passing frequency.

25. The engine of claim 24, further comprising:
a cooling cavity substantially surrounding said pressure sensor, and
an inlet for receiving compressed fluid from said compressor and feeding said compressed fluid to said cooling cavity to cool said pressure sensor.

26. The engine of claim 25, wherein said compressed fluid comprises air.

* * * * *